UNITED STATES PATENT OFFICE.

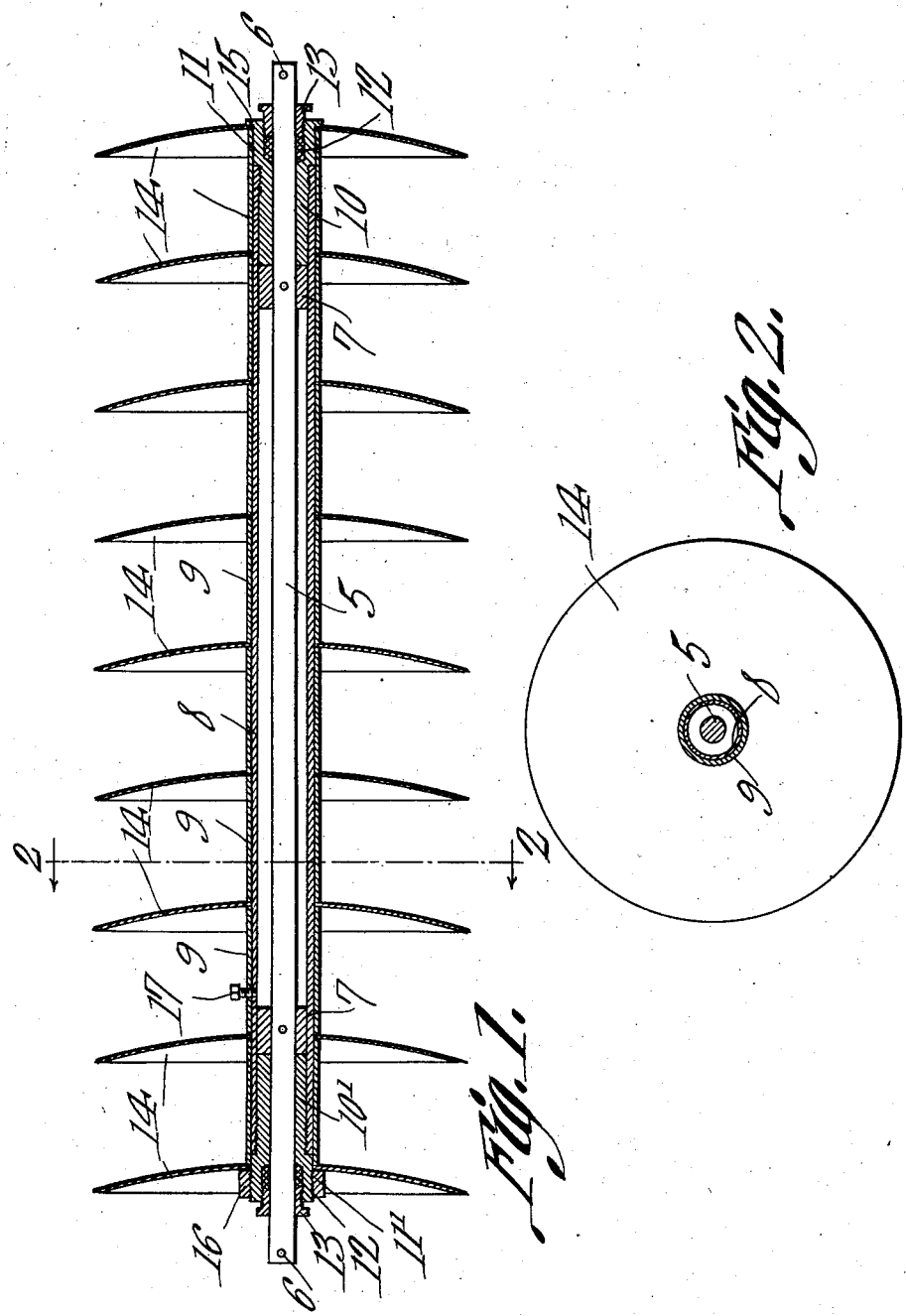
M. ELSAS.
HARROW.
APPLICATION FILED AUG. 7, 1911.
1,021,977.
Patented Apr. 2, 1912.
Marshal Elsas, Inventor
Witnesses

MARSHAL ELSAS, OF SCOTT, KANSAS.

HARROW.

1,021,977. Specification of Letters Patent. Patented Apr. 2, 1912.

Application filed August 7, 1911. Serial No. 642,615.

*To all whom it may concern:*

Be it known that I, MARSHAL ELSAS, a citizen of the United States, residing at Scott, in the county of Scott and State of Kansas, have invented a new and useful Harrow, of which the following is a specification.

This invention relates to harrows and particularly to disk harrows.

The object of this invention is to provide a fixed shaft upon which the disks are adapted to revolve.

A further object is to provide a device of this character which has an oil reservoir within the casing on which the disks are mounted for the purpose of lubricating the said casing.

Further objects will be evident from the hereinafter description.

With the above objects in view this invention is embodied essentially in a fixed shaft, a tubular casing on the said shaft having bearings on the ends thereof through which the shaft passes, a plurality of disks on the said tubular casing and spaced apart by suitable sleeves, means for securing the disks in position, and means on the outer ends of the said bearings for preventing the escape of oil contained within the tubular casing and for excluding dust and other foreign matter.

The invention is illustrated in the accompanying drawing, in which similar reference characters indicate similar parts, and in which:—

Figure 1 is a vertical longitudinal section taken through the center of the harrow section. Fig. 2 is a section on the line 2—2 of Fig. 1.

Referring specifically to the drawings, 5 designates a suitable fixed shaft having the holes 6 at the end thereof for the securement of a suitable draft mechanism thereto. Encompassing this shaft 5 is a tubular casing 8 which is internally screw threaded at its extremities. This tubular casing 8 is shorter than the shaft 5, to permit the ends of the shaft to protrude therefrom. Bearings 11 and 11' which have the reduced extensions 10 and 10', respectively, which extensions are externally screw-threaded, are engaged to the ends of the tubular casing 8 by screwing the extensions 10 and 10' thereof into the ends thereof, the enlarged portions thereof abutting against the ends of the casing. The diameter of the bearings 11 and 11' is equal to that of the tubular casing 8 to bring the surfaces thereof flush. The bearing 11 is provided with a radial projecting flange 15 at the outer end thereof and the other bearing 11' has the outer end thereof externally screw threaded. Each of the bearings 11 and 11' are provided with a stuffing box 12 in the outer end thereof surrounding the shaft 5, the said stuffing boxes having screw threaded walls into which the glands 13 are adapted to screw to compress the packing within the stuffing boxes. Collars 7 are secured to the shaft 5 within the tubular casing 8 and against which the inner ends of the bearings 11 and 11' abut.

A plurality of disks 14 of usual concave construction are arranged on the tubular casing 8, the disk at one end being arranged on the bearing 11 and resting against the flange 15 and the disk at the other end being arranged on the bearing 11', sleeves 9 arranged between the several disks and on the tubular casing 8 retain the disks in spaced position. A jam nut 16 is screwed on the outer end of the bearing 11' which locks disks 14 rigidly between the sleeves 9. One of the sleeves 9 is tapped, which tap extends through the tubular casing 8, and a screw plug 17 is adapted to normally close the openings formed thereby. The plug 17 when removed permits a suitable lubricant to be poured into the chamber formed within the tubular casing 8. Thus it will be seen that the shaft 5 may be secured rigidly to a suitable frame or draft mechanism and disks 14 in traveling over the earth are revolved with the tubular casing, the bearings 11 and 11' thereof turning on the shaft and being lubricated by the lubricant contained within the tubular casing. This device comprises one section of the entire harrow mechanism, it being general practice to employ several such sections. The collars 7 bearing against the inner ends of the bearings 11 and 11' prevent the longitudinal movement of the tubular casing. These collars are secured to the shaft in any suitable manner. The stuffing boxes provided on the outer ends of the bearings retain the lubricant within the tubular casing and prevents the ingress of dust or other foreign matter. By removing the jam nut 16 the various disks and sleeves may be removed when desired or necessary for repair or other purposes.

It is understood that this invention is not limited to the specific form and construction of details and that same is susceptible of various alterations in the scope of the appended claims without departing from the spirit of the invention.

What is claimed is:—

1. In a harrow, the combination with a fixed shaft, of a tubular casing encompassing the said shaft, bearings mounted on the ends of the said casing and provided with stuffing boxes, glands for the said stuffing boxes, and a plurality of disks mounted on the said tubular casing.

2. In a harrow, the combination with a fixed shaft, of a tubular casing encompassing the said shaft, bearings secured to the ends of the said tubular casing through which the said shaft passes, one of the said bearings having a radially projecting flange on the outer end thereof and the other bearing having the outer end externally screw-threaded, a plurality of disks, sleeve spacing the said disks apart, and a jam nut screwed on the outer end of the said bearing having the external screw threads to secure the disks and blades between the said flange and jam nut, one of the said sleeves having a tapped opening extending through the said tubular casing, and a screw plug engaged in the said opening.

In testimony that I claim the foregoing as my own, I have hereto affixed my signature in the presence of two witnesses.

MARSHAL ELSAS.

Witnesses:
FRANK L. BROOKS,
ELISHA CHANCE.

Copies of this patent may be obtained for five cents each, by addressing the "Commissioner of Patents, Washington, D. C."